July 4, 1933.  V. J. BURNELLI  1,916,413
AMPHIBIAN AIRCRAFT
Filed July 27, 1929
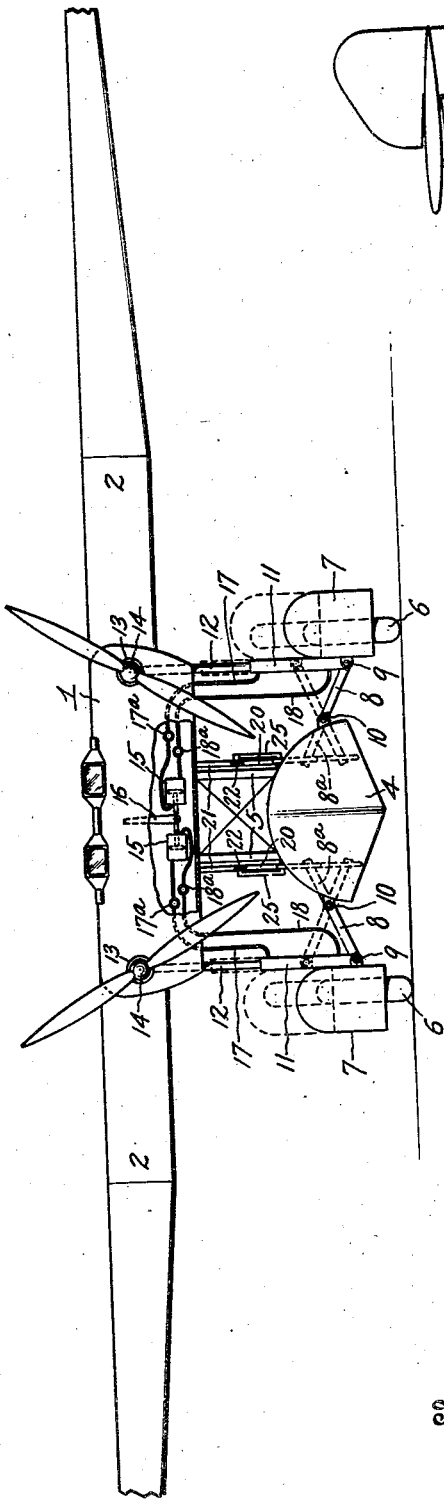
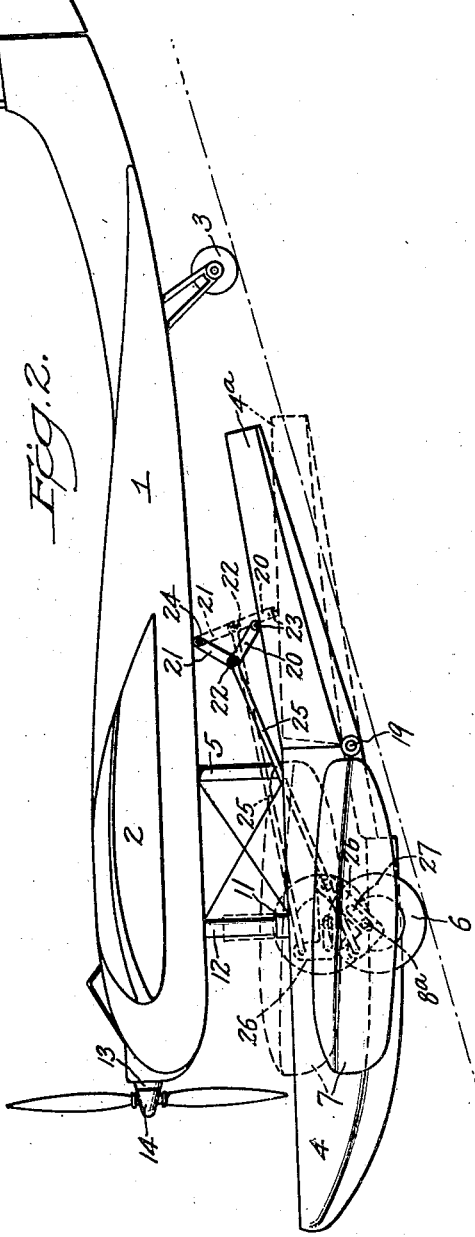
Inventor
Vincent J. Burnelli
By his Attorney
Frederick W. Barker Patented July 4, 1933

1,916,413

UNITED STATES PATENT OFFICE

VINCENT J. BURNELLI, OF NEW YORK, N. Y., ASSIGNOR, BY MESNE ASSIGNMENTS, TO BURNELLI AIRCRAFT, LTD., OF DOVER, DELAWARE, A CORPORATION OF DELAWARE

AMPHIBIAN AIRCRAFT

Application filed July 27, 1929. Serial No. 381,433.

This invention relates to amphibian aircraft having retractible wheels for land traction and a pontoon for support on water, and my improvements are directed to the following novel features.

The wheels, which normally extend below the pontoon, are provided with attached housings in the form of floats, said floats, when elevated with the wheels, having contact with the water surface to thereby assist the pontoon in maintaining equilibrium of the craft.

The pontoon, while of suitable length for flotation purposes, is too long when the wheeled traction means are in service, because then its rear portion interferes with the surface line between the traction wheels and the tail skid. Therefore in my improvement the rear portion of the pontoon is hinged and adapted to swing upwardly.

Means are provided under the pilots' control for retracting and extending the traction wheels with their float housings; and other means coordinated therewith, are provided for simultaneously shifting the rear portion of the pontoon between its up and down positions.

Other features and advantages of my invention will hereinafter appear.

In the drawing:

Figure 1 is a front elevation of an amphibian airplane having my improvements, and Fig. 2 is a side elevation thereof.

In said views let 1 indicate an airfoil fuselage of the Burnelli type, 2 the main supporting airfoils, 3 a wheeled skid extended from the rear portion of the fuselage, 4 a pontoon connected with the fuselage by struts 5, and 6 the traction wheels which are journalled in housings 7, said housings having the form of floats.

The wheeled landing gear is shown in full lines in its operative position and in dotted lines as retracted.

The wheels and housings are connected to the pontoon by means of bars 8 that are pivoted respectively to said housings and pontoons as indicated at 9, 10, whereby said wheels and housings are capable of vertical movement. Attached to the housings 7, at their respective inner surfaces, are the cylinders 11, forming part of hydraulic control means, said cylinders containing plungers whose plunger rods 12 are extended up to the bearings 13 for the propeller shafts 14, where they have pivoted connection.

The cylinders 11 and their plunger rods 12 constitute telescopic connecting means between the fuselage, at the propeller bearings 13, and the floats, in addition to their service in the hydraulic operating system.

As means for moving the cylinders 11 vertically and thereby retracting or extending the housings and wheels I have shown a master cylinder 15, with operating means 16, included in the hydraulic system, flexible pipes 17 and 18 leading respectively from cylinder 15 to the cylinders 11, at opposite sides of the plungers therein, said pipes 17, 18 being provided with valves 17$^a$, 18$^a$ under the control of the pilot, so that the hydraulic pressure may be applied either to raising or lowering the cylinders 11, respectively for retraction or extension of the landing gear.

In the vertical movement of cylinders 11 and attached housings and wheels a slight lateral movement thereof occurs because of the pivoted connection of bars 8 with the pontoon, and it is for this reason that each plunger rod 12 is pivotally connected at its upper end, instead of having rigid means of connection.

The pontoon, to have suitable length for flotation purposes while supporting the aircraft, is found to interfere at its rear portion with the operation of the aircraft upon land, because the surface line between the traction wheels and the tail skid runs through said rear portion. Therefore I form the pontoon in two parts, viz: the forward part 4 and the rearward part 4$^a$, these parts being hinged together as at 19, and having their opposed ends spaced apart over a V-shaped gap when the part 4$^a$ is lowered for use on water; the gap being sufficient in extent for the rear part 4$^a$ to be raised above the surface line between the traction wheels, as extended, and the tail skid, so that it will not then interfere with the operation of the aircraft on land.

As means for shifting the pontoon part 4ᵃ between its two positions I provide pairs of links 20, 21, each pair being pivoted together at 22, and, at their outer ends, having pivoted connection respectively with the part 4ᵃ and with the fuselage 1. Thus the link 20 of each pair is pivoted at 23 to the part 4ᵃ, and the link 21 of each pair is pivoted at 24 to the fuselage. A rod 25 has pivoted engagement with the joint or pivot 22, and is movable longitudinally to either "break" the joint between links 20, 21, or to extend said links. The joint in Fig. 2 is shown "broken" in full lines, the part 4ᵃ then being raised, and the links 20, 21 are shown extended in dotted lines, with the part 4ᵃ lowered.

In the lowered position of part 4ᵃ it is held and braced from the fuselage by the extended position of links 20, 21.

The rods 25 each engage pivotally at their forward ends with bell-cranks 26, that have slots 27 to receive extended end portions 8ᵃ of bars 8, to be actuated thereby in the operation of the hydraulic means for retracting and extending the landing gear.

By the arrangement shown, the pontoon part 4ᵃ becomes automatically or synchronously raised in the act of extending the landing gear for service, and said part 4ᵃ likewise becomes lowered for pontoon use in the act of retracting the landing gear.

As the extensions 8ᵃ of bars 8 are entered through openings in the side walls of the pontoons suitable means (not herein shown) may be provided to prevent the entry of water through such openings.

Also, since the pontoon is made in the two parts, 4, 4ᵃ, the opposed ends of said parts are necessarily provided with individual closure means.

Variations within the spirit and scope of my invention are equally comprehended by the foregoing disclosure.

I claim:

1. The combination with an airplane having a fuselage and a pontoon connected therewith, of landing gear disposed at opposite sides of said pontoon and movable between positions below and above the pontoon bottom, said pontoon composed of forward and rear parts in hinged relation, and means for raising and lowering said rear part of the pontoon.

2. The combination with an airplane having a fuselage and a pontoon connected therewith, of landing gear disposed at opposite sides of said pontoon and shiftable between positions below and above the pontoon bottom, said pontoon composed of forward and rear parts in hinged relation, means for shifting said landing gear, and means coacting with said shifting means for raising and lowering said rear part of the pontoon.

3. The combination in an airplane having a fuselage and a pontoon connected therewith, of landing gear comprising floats disposed respectively at opposite sides of said pontoon and traction wheels that are journalled and partly housed within said floats, means of pivotal connection between said floats and pontoon that permit said floats to be moved up and down in a substantially vertical plane, and hydraulic means, including a cylinder element and a piston element, for moving said floats, one of said elements being attached to a float and the other element being pivotally connected to the fuselage.

4. The combination in an airplane having a fuselage and a pontoon connected therewith, of floats spaced respectively from the opposite sides of said pontoon, traction wheels journalled and partially housed in said floats, pivotal supporting means between said floats and pontoon that permit said floats to be moved up and down in a substantially vertical plane, and hydraulic means, under the pilot's control, for moving said floats.

5. The combination in an airplane having a body and a pontoon connected therewith, of floats spaced respectively from the opposite sides of said pontoon, traction wheels journalled and partially housed in said floats, pivotal supporting means between said floats and pontoon that permit said floats to be moved bodily up and down in a substantially vertical plane, and actuating means, under the pilot's control, for moving said floats.

Executed this 24th day of July, 1929.

VINCENT J. BURNELLI.